(12) United States Patent
Balasubramanian et al.

(10) Patent No.: US 9,531,551 B2
(45) Date of Patent: Dec. 27, 2016

(54) DYNAMICALLY CONFIGURABLE POWER-OVER-ETHERNET APPARATUS AND METHOD

(71) Applicant: Cisco Technology, Inc., San Jose, CA (US)

(72) Inventors: Koussalya Balasubramanian, Santa Clara, CA (US); Charles Calvin Byers, Wheaton, IL (US); Matthew A. Laherty, Bloomington, IN (US)

(73) Assignee: Cisco Technology, Inc., San Jose, CA (US)

( * ) Notice: Subject to any disclaimer, the term of this patent is extended or adjusted under 35 U.S.C. 154(b) by 196 days.

(21) Appl. No.: 14/469,006

(22) Filed: Aug. 26, 2014

(65) Prior Publication Data
US 2016/0064938 A1    Mar. 3, 2016

(51) Int. Cl.
G06F 1/26 (2006.01)
H02J 4/00 (2006.01)
H04L 12/10 (2006.01)

(52) U.S. Cl.
CPC ............ H04L 12/10 (2013.01); Y02B 60/44 (2013.01)

(58) Field of Classification Search
None
See application file for complete search history.

(56) References Cited

U.S. PATENT DOCUMENTS

| | | | |
|---|---|---|---|
| 7,620,846 B2 * | 11/2009 | Biederman | ............. H04L 12/10 714/14 |
| 7,835,295 B2 | 11/2010 | Brewer et al. | |
| 8,375,232 B2 | 2/2013 | Khan et al. | |
| 8,502,408 B2 | 8/2013 | Schneider et al. | |
| 8,725,905 B2 | 5/2014 | Terry et al. | |
| 9,110,972 B2 | 8/2015 | Hamdi et al. | |
| 9,176,555 B2 | 11/2015 | Choo et al. | |
| 2006/0089230 A1 * | 4/2006 | Biederman | ............. H04L 12/10 477/34 |

(Continued)

FOREIGN PATENT DOCUMENTS

| | | |
|---|---|---|
| WO | 2014/129966 | 8/2014 |
| WO | 2015/144457 | 10/2015 |

OTHER PUBLICATIONS

Allied Telesyn, "How to Power over Ethernet", 2005, www.alliedtelesyn.com, 12 pages.

(Continued)

*Primary Examiner* — Fahmida Rahman
(74) *Attorney, Agent, or Firm* — Edell, Shapiro & Finnan, LLC (57) ABSTRACT

One or more dual-role Power-over-Ethernet (PoE) port units are each selectively configurable to operate as either (i) a PoE Power Source Equipment (PSE) port unit to provide power to a device connected to the PoE port unit, or (ii) a PoE Powered Device (PD) port unit to sink power from the connected device. Each PoE port unit includes a network port, and a bi-directional power converter to selectively convert power in either (i) a first direction and to provide converted power to the network port when the PoE port unit operates as the PSE port unit, or (ii) in a second direction to convert power received from the network port when the PoE port unit operates as the PD port unit.

23 Claims, 7 Drawing Sheets

(56) References Cited

U.S. PATENT DOCUMENTS

| | | | |
|---|---|---|---|
| 2006/0273661 A1* | 12/2006 | Toebes | G06F 1/266 307/106 |
| 2010/0007334 A1* | 1/2010 | Apfel | H04L 12/10 324/123 R |
| 2012/0173905 A1* | 7/2012 | Diab | H04L 12/66 713/320 |
| 2013/0301745 A1 | 11/2013 | Maniktala | |
| 2014/0115354 A1 | 4/2014 | Jabbaz et al. | |
| 2015/0256748 A1 | 9/2015 | Herzel | |

OTHER PUBLICATIONS

Mendelson, "All You Need to Know About Power over Ethernet (PoE) and the IEEE 802.3af Standard", May 2004, 24 pages.

CIE-Group, "CYP III, CYP-PU-607BD-RX: HDMI over Single CAT5e/6/7 HDBaseT-Bi-directional PoE Receiver", retrieved Aug. 26, 2014, http://www.cie-group.com/shop/av-distribution__19/hdbaset__1025/hdbaset-transmitters--receivers__1028/hdmiover-single-cat5e/6/7-hdbaset-bi-directional-poe-receiver__11101.php, 2 pages.

"Specific Electrical Design Requirements for Commercial Buildings—Part One", http://www.electrical-knowhow.com/2012/02/specific-electrical-design-r . . . , downloaded from the internet on Nov. 11, 2015, 5 pages.

Palizban et al., "Microgrids in Active Network Management—Part 1: Hierarchical Control, Energy Storage, Virtual Power Plants, and Market Participation", Aalborg University, Denmark, Published in: Renewable & Sustainable Energy Reviews, vol. 36, Aug. 2014, 35 pages.

Stojmenovic, Ivan; "Fog computing: A cloud to the ground support for smart things and machine-to-machine networks", 2014 Australasian Telecommunication networks and Applications Conference (ATNAC), Nov. 26-28, 2014, Southbank, VIC, pp. 117-122.

Taft, J.D. "The Emerging Interdependence of the Electric Power Grid & Information and Communication Technology", Final, Aug. 2015, prepared for the U.S. Department of Energy, Pacific Northwest National Laboratory, PNNL-24643, 79 pages.

Palizban et al., "Microgrids in Active Network Management—Part II: System Operation, Power Quality and Protection", Aalborg University, Denmark, Published in: Renewable & Sustainable Energy Reviews, vol. 36, Aug. 2014, 31 pages.

* cited by examiner

```
┌─────────────────────────────────────────────────────────┐
│  DETERMINE FOR EACH ENDPOINT DEVICE POWER-RELATED       │── 705
│  INFORMATION INCLUDING A POWER CONSUMPTION, A POWER NEED,│
│         AND A POWER PRODUCTION, IF ANY                  │
│  - POLL ENDPOINTS FOR THE INFORMATION, OR               │
│  - RECEIVE TELEMETRY REPORTS                            │
└─────────────────────────────────────────────────────────┘
                            │
                            ▼
┌─────────────────────────────────────────────────────────┐
│  DETERMINE A PREFERRED POWER FLOW DIRECTION AT EACH     │── 710
│    ENDPOINT DEVICE BASED ON THE DETERMINED POWER-       │
│     RELATED INFORMATION FOR THAT ENDPOINT DEVICE        │
│  - PREFERRED DIRECTION IS TO THE ENDPOINT DEVICE        │
│    IF THE ENDPOINT DEVICE NEEDS POWER                   │
│  - PREFERRED DIRECTION MAY BE FROM THE ENDPOINT DEVICE  │
│    IF IT INDICATES EXCESS POWER                         │
└─────────────────────────────────────────────────────────┘
                            │
                            ▼
┌─────────────────────────────────────────────────────────┐
│  CONTROL THE POWER FLOW DIRECTION AT EACH ENDPOINT      │── 715
│   DEVICE BASED ON THE POWER-RELATED INFORMATION AND     │
│   THE PREFERRED POWER FLOW DIRECTION DETERMINED FOR     │
│  THAT ENDPOINT DEVICE; MAY REQUIRE A REVERSAL OF POWER  │
│          FLOW AT THE ENDPOINT DEVICE SO AS TO:          │
│  - DIRECT POWER FLOW TOWARDS THE ENDPOINT DEVICE IF     │
│    IT IS DETERMINED THAT THE ENDPOINT DEVICE NEEDS POWER│
│  - DIRECT POWER FLOW FROM THE ENDPOINT DEVICE IF        │
│    IT IS DETERMINED THAT THERE IS EXCESS POWER AVAILABLE│
└─────────────────────────────────────────────────────────┘
```

DYNAMICALLY CONFIGURABLE POWER-OVER-ETHERNET APPARATUS AND METHOD

TECHNICAL FIELD

The present disclosure relates generally to Power-over-Ethernet.

BACKGROUND

A Power-over-Ethernet (PoE) system includes Power Source Equipment (PSE) to provide power over an Ethernet cable to a Powered Device (PD) that sinks the power. The PSE includes a PSE port that provides the power to one end of the Ethernet cable mated to the PSE port, and the PD includes a PD port that sinks the power from an opposite end of the Ethernet cable mated to the PD port. Conventionally, the PSE port is fixed as a PSE port and the PD port is fixed as PD port; that is, the PoE ports are unable to switch between respective power sourcing and power sinking roles.

DESCRIPTION OF EXAMPLE EMBODIMENTS

Overview

Embodiments presented herein are directed to dynamically configurable Power-over-Ethernet (PoE) techniques. One embodiment includes one or more dual-role PoE port units each selectively configurable to operate as either (i) a PoE Power Source Equipment (PSE) port unit to provide power to a device connected to the PoE port unit, or (ii) a PoE Powered Device (PD) port unit to sink power from the connected device. Each PoE port unit includes a port to mate with a network cable, and a bi-directional power converter to selectively convert power in either (i) a first direction and to provide converted power to the port when the PoE port unit is configured to operate as the PSE port unit, or (ii) in a second direction to convert power received from the port and provide converted power to associated circuits when the PoE port unit is configured to operate as the PD port unit. In an embodiment, the bi-directional power converter includes a bi-directional direct current (DC)-to-DC voltage converter to selectively convert DC voltage in either the first direction and provide converted DC voltage to the port when the PoE port unit is configured to operate as the PSE port unit, or in the second direction to convert DC voltage received from the port and provide converted DC voltage to associated circuits when the PoE port unit is configured to operate as the PD port unit.

Another embodiment is directed to a power management controller that controls power flow to or from endpoint devices in a network thereof that are selectively configurable to either sink or source power through respective PoE links that connect the endpoints to one or more respective network devices configured to communicate with the power management controller. Each PoE link terminates at opposite ends thereof in a PoE network port unit of a corresponding network device and a PoE endpoint port unit of a corresponding endpoint device. Each of the PoE network port units and endpoint port units are selectively configurable to support bi-directional power flow over the corresponding PoE link to or from the endpoint device, respectively. The controller determines for each endpoint device power-related information, including a power consumption, a power need, a power production, if any, and an energy reserve in a local battery. The controller determines a preferred power flow direction at each endpoint device based on the determined power-related information for that endpoint device. The controller controls the power flow direction at each endpoint device based on the power-related information and the preferred power flow direction determined for that endpoint device.

In yet another embodiment, a network device includes multiple dual-role PoE network port units, each PoE port unit being selectively configurable to operate as either (i) a PoE PSE port unit to provide power to a device connected to the PoE port unit, or (ii) a PoE PD port unit to sink power from the connected device. The network device also includes a switch unit to switch packets between the multiple PoE network port units. The network includes a controller to selectively configure each PoE port unit to operate as either the PoE PSE port unit or the PoE PD port unit independently of other ones of the multiple PoE network ports.

Example Embodiments

Figure 1:
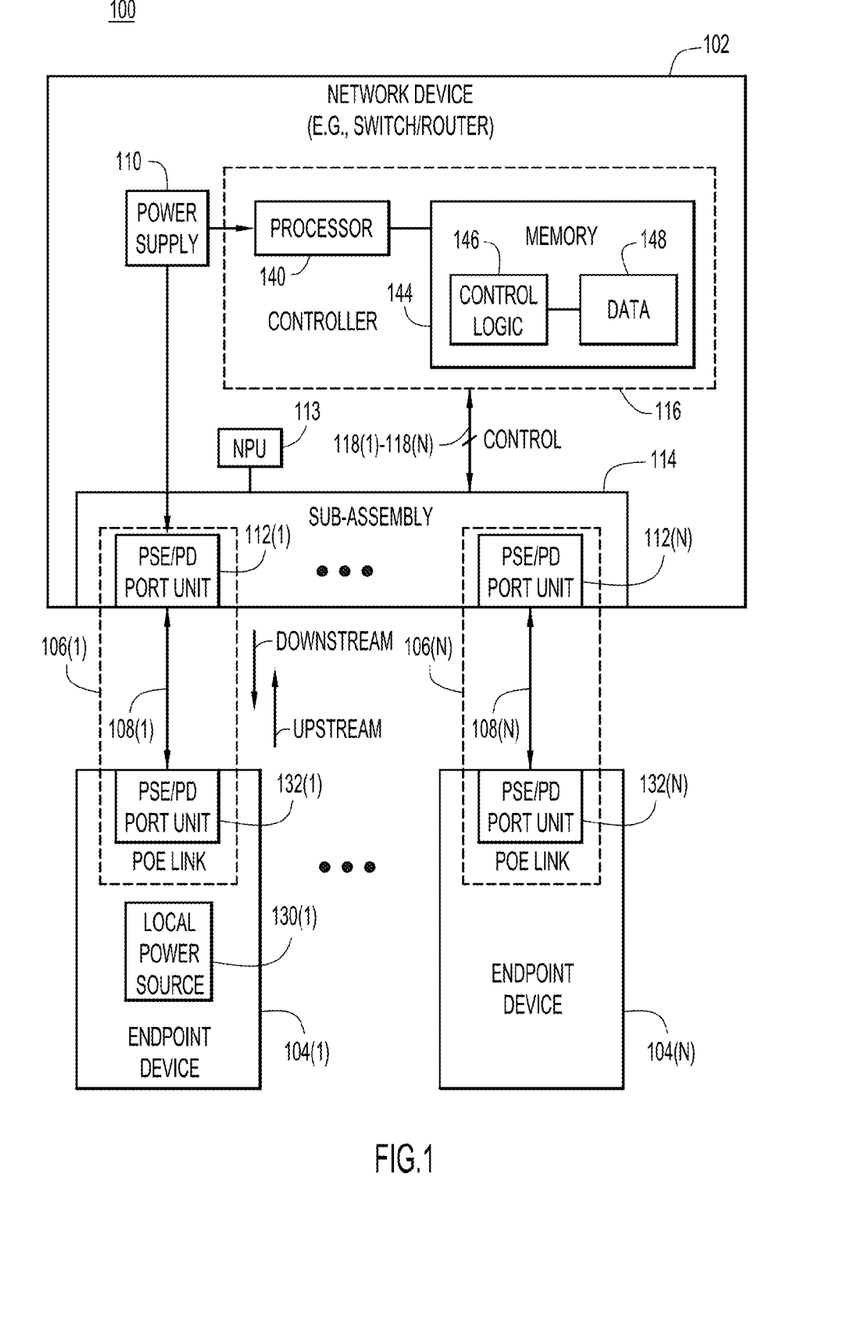
FIG. 1 is a block diagram of an example system in which dual-role dynamically configurable Power-over-Ethernet (PoE) techniques presented herein may be implemented, according to an example embodiment.

Referring first to FIG. 1, there is shown a block diagram of an example system 100 in which dynamically configurable dual-role Power-over-Ethernet embodiments presented herein may be implemented. System 100 includes a network device 102, such a network switch or router, connected to multiple endpoint devices (EDs) 104(1)-104(N), e.g., Internet-of-Things (IOT) devices, through corresponding ones of multiple PoE links 106(1)-106(N). Network device 102 and EDs 104 may form part of a large collection of distributed network devices and EDs accessible through a communication network that includes one or more wide area networks (WANs), such as the Internet, and one or more local area networks (LANs).

Each PoE link 106(i) conveys bi-directional Ethernet data between network device 102 and connected ED 104(i) over a corresponding one of PoE link Ethernet cables 108(1)-108(N). Each PoE link 106(*i*) also selectively conveys bi-directional power (i.e., voltage and current flowing in a specific direction) between network device 102 and connected device 104(*i*) over Ethernet cable 108(*i*), according to techniques presented herein. That is, each PoE link 106(*i*) is selectively configurable to convey power either in a first (i.e., downlink) direction from network device 102 to connected ED 104(*i*), or in a second (i.e., uplink) direction from the connected device to the network device, as is described in detail below.

Network device 102 includes:
a. a power supply 110 or other power source to provide power for the network device and, optionally, EDs 104 over PoE links 106;
b. multiple dual-role PoE port units 112(1)-112(N) (each referred to as a "PSE/PD port unit" in FIG. 1 for reasons that will become apparent from the ensuing description) hosted on at least one sub-assembly 114 of the network device, e.g., a line card or a power sub-assembly. Each PoE port unit 112(*i*) mates with a corresponding connector of Ethernet cable 108(*i*) to terminate PoE link 106(*i*) at the network end of the PoE link;
c. a controller 116 to control the network device generally, and also to control each dual-role PoE port unit 112(*i*) through a respective one of selection signals 118(1)-118(N); and
d. a network processor unit (NPU) 113 coupled to PoE port units 112 to switch and otherwise process data packets between the port units.

Each dual-role PoE port unit 112(*i*) is selectively configurable responsive to respective selection signal 118(*i*) received at the PoE port unit to operate as either (i) a PoE Power Source Equipment (PSE) port unit to provide/source power to connected ED 104(*i*), or (ii) a PoE Powered Device (PD) port unit to sink/receive power from the connected ED. Each PoE port unit 114(*i*) performs (i) PSE operations including, but not limited to, PoE PD detection, optional classification, start-up, operation, and disconnect when the PoE port unit is configured to operate as the PSE port unit, or (i) PD operations when the PoE port unit is configured to operate as the PD port unit. The aforementioned PSE/PD operations may be performed in accordance with the IEEE 802.3 specification/standard.

Each ED 104(*i*) includes endpoint circuitry (not shown in FIG. 1) to perform various ED functions. Each ED 104(*i*) may also include a local power source to generate power local to the ED and provide the power to the endpoint circuitry. For example, ED 104(1) includes a local power source 130(1) to power local circuits in the ED. If local power source 130(1) has excess power available after powering the local circuits in ED 104(1), the local power source may also provide the excess power to network device 102 over Ethernet cable 108(1). The local power source may include, but is not limited to, a battery, solar panel, energy harvesting subsystem, and an alternating current (AC) power source.

Each ED 104(*i*) also includes a corresponding selectively configurable dual-role PoE port unit 132(*i*). Each dual-role PoE port unit 132(*i*) mates with a connector of Ethernet cable 108(*i*) so as to terminate PoE link 106(*i*) in ED 104(1). Thus, each PoE link 106(*i*) comprises selectively configurable dual-role port units 112(*i*) and 132(*i*) mated to opposite ends of Ethernet cable 108(*i*). Each ED PoE port unit 132(*i*) is configured similarly to corresponding dual-role port unit 112(*i*) so as to be selectively configurable responsive to a selection signal in ED 104(*i*) (not shown) to operate as either (i) a PoE PSE port unit to provide/source power to network device 102, or (ii) a PoE PD port unit to sink/receive power from the network device. Thus, each PoE link 106(*i*) comprises selectively configurable dual-role port units 112(*i*) and 132(*i*) mated to opposite ends of Ethernet cable 108(*i*).

To convey power in the downlink direction on each PoE link 106(*i*), port units 112(*i*) and 132(*i*) are selectively configured to operate as PoE PSE and PD port units, respectively. To convey power in the reverse or uplink direction, port units 112(*i*) and 132(*i*) are selectively configured to operate as PoE PD and PSE port units, respectively. In an example, power supply 110 of network device 102 may normally provide power to ED 104(1) through PoE link 106(1). In that case, PoE link 106(1) is selectively configured so that a direction of power flow over the link is in the downstream direction. On the other hand, if ED local power source 130(1) has generated an excess of power in ED 104(1), and if network device 102 has determined that the network device needs additional power, the direction of power flow over PoE link 106(1) may be reversed from the downstream direction to the upstream direction so as to route the excess power from ED 104(1) to network device 102. In an example where power supply 110 is connected with the national power grid, the excess power from ED 104 may be fed from network device 102 to the grid.

The above-described selective configurability of PoE port units 112 and 132 permits selectively controlled dynamic switching between PSE and PD roles of the port units on opposite ends of respective one ones Ethernet cables 108 at any given instant, which results in selectively controlled dynamic switching of power flow directions through the cables so that power can flow bi-directionally, as and when needed. Such dynamic switching between the PSE/PD roles is advantageous in a number of scenarios, such as in a distributed energy system for a network of PoE connected streetlights, where each light fixture includes a solar panel and battery associated with an endpoint device. At night, the PoE flow is in one direction, transferring energy from a central switch, e.g., network device 102 or other switch, to each fixture, e.g., endpoint device. During the day, the local solar panels may convert more power than can be used on each fixture, and if the PoE energy transfer direction is reversed, this energy is available for use elsewhere in the network. Other network installations could use bidirectional PoE capabilities to provide fault tolerance in case certain power supplies or elements fail.

As mentioned above, controller 116 generates control/selection signals 118 to control and monitor PoE port units 112. In support of this, controller 116 includes a central processing unit (CPU) 140 (also referred to simply as a "processor" 140), and a memory 144. The processor 140 is, for example, a microprocessor or microcontroller that executes software instructions stored in the memory 144 to perform higher level control of network device 102 and lower level control of PoE port units 112 through selection signals 118. Memory 144 may comprise read only memory (ROM), random access memory (RAM), magnetic disk storage media devices, optical storage media devices, electrical, optical, or other physical/tangible memory storage devices. Thus, in general, the memory 144 may comprise one or more tangible (non-transitory) computer readable storage media (e.g., a memory device) encoded with software comprising computer executable instructions and when the software is executed (by the processor 140) it is operable to perform the techniques described herein. For example, memory 144 stores or is encoded with instructions for Control logic 146 to perform operations to control PoE port units 112. In addition, memory 144 stores data 148 used and generated by the processor 140 when executing control logic 146. An example of Control logic 146 used to manage power in system 100 will be described below in connection with FIGS. 6 and 7.

Figure 2:
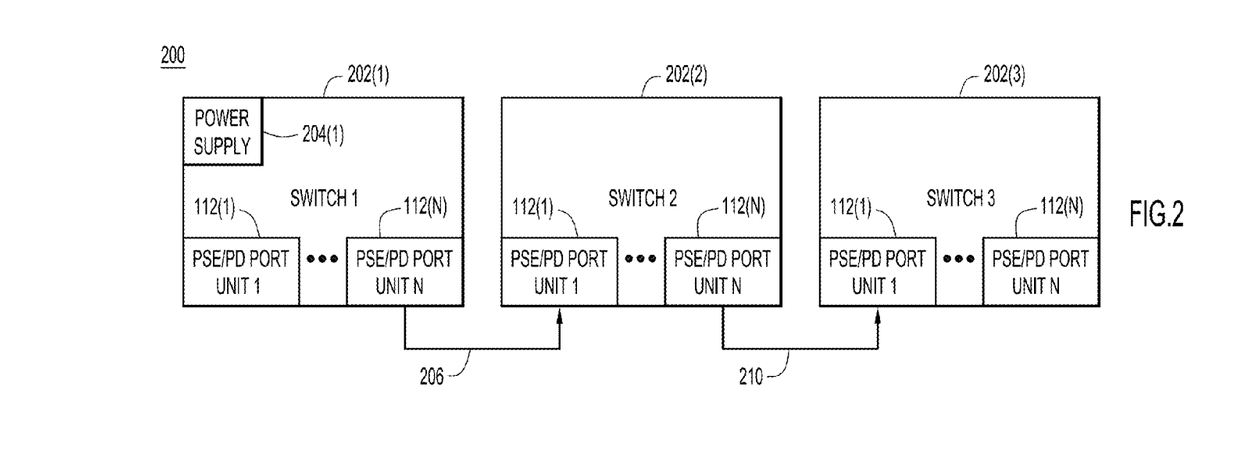
FIG. 2 is a block diagram of an example system of multiple network devices that are powered using dynamically configurable PoE links, according to an example embodiment.

With reference to FIG. 2, there is a block diagram of a system 200 of multiple network devices 202(1)-202(2) that are powered using dynamically configurable PoE links as described above, according to an embodiment. Each of network devices 202(i) includes, and controls, dual-role PoE port units 112(1)-112(N) of that network device as described above. Network device 202(1) includes a power supply 204(1) to supply power to all of network devices 202(1)-202(3) in sequence, in the following manner. Port unit 112(N) of network device 202(1) is selectively configured to operate as a PSE port unit to feed power (from power supply 204(1)) over an Ethernet cable 206 to port unit 112(1) of network device 202(2), and port unit 112(1) of network device 202(2) is selectively configured to operate as a PD port unit to receive/sink the power from network device 202(1). With the power received from network device 202(1), network device 202(2) powers itself and, if there is an excess of power after powering itself, can power network device 202(3). To do this, port unit 112(N) of network device 202(2) is selectively configured to operate as a PSE port unit to feed the excess power over an Ethernet cable 210 to port unit 112(1) of network device 202(3), and port unit 112(1) of network device 202(3) is selectively configured to operate as a PD port unit to receive/sink the power from network device 202(2).

Figure 3:
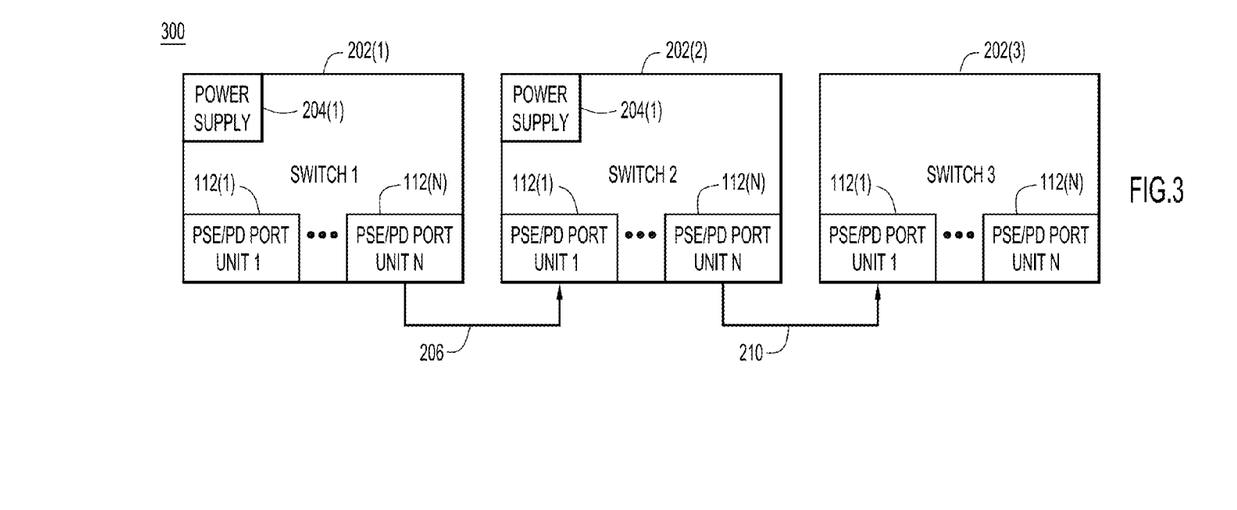
FIG. 3 is a block diagram of an example system of multiple network devices that are powered using dynamically configurable PoE links, according to another example embodiment.

With reference to FIG. 3, there is a block diagram of a system 300 of multiple network devices 202(1)-202(2) that are powered using PoE links, according to another embodiment. System 300 is similar to system 200, except that network device 202(2) also includes a power supply 204(2). Initially, network device 202(1) powers network device 202(2) as described for system 200, so power supply 204(2) of network device 202(2) is not used. If a power failure, overload or other fault of power supply 204(1) is detected in network device 202(1), then power supply 204(2) of network device 202(2) may be used as an additional/redundant power supply. Also, if network device 202(1) requires more power that power supply 204(1) is able to supply, then power supply 204(2) of network device 202(2) may supply power to network device 202(1). To do this, port unit 112(N) of network device 202(1) is selectively configured (reversed) to operate as a PoE PD port unit and port unit 112(1) of network device 202(2) is selectively configured (reversed) to operate as a PSE port unit. In each of network devices 202(1) and 202(2), the respective controller 116 selectively configures port units 112 to set a direction of power flow in cables 206 and 210 as needed without manual intervention. Depending upon the instantaneous energy needs and ongoing fault states of each of the network devices 202, the PSE/PD ports 112 assume the appropriate roles to send the PoE energy in the direction needed. As energy demands change, and elements of network devices 202 fail and are repaired, the energy flow on PoE cable 206 could change dynamically.

Figure 4:
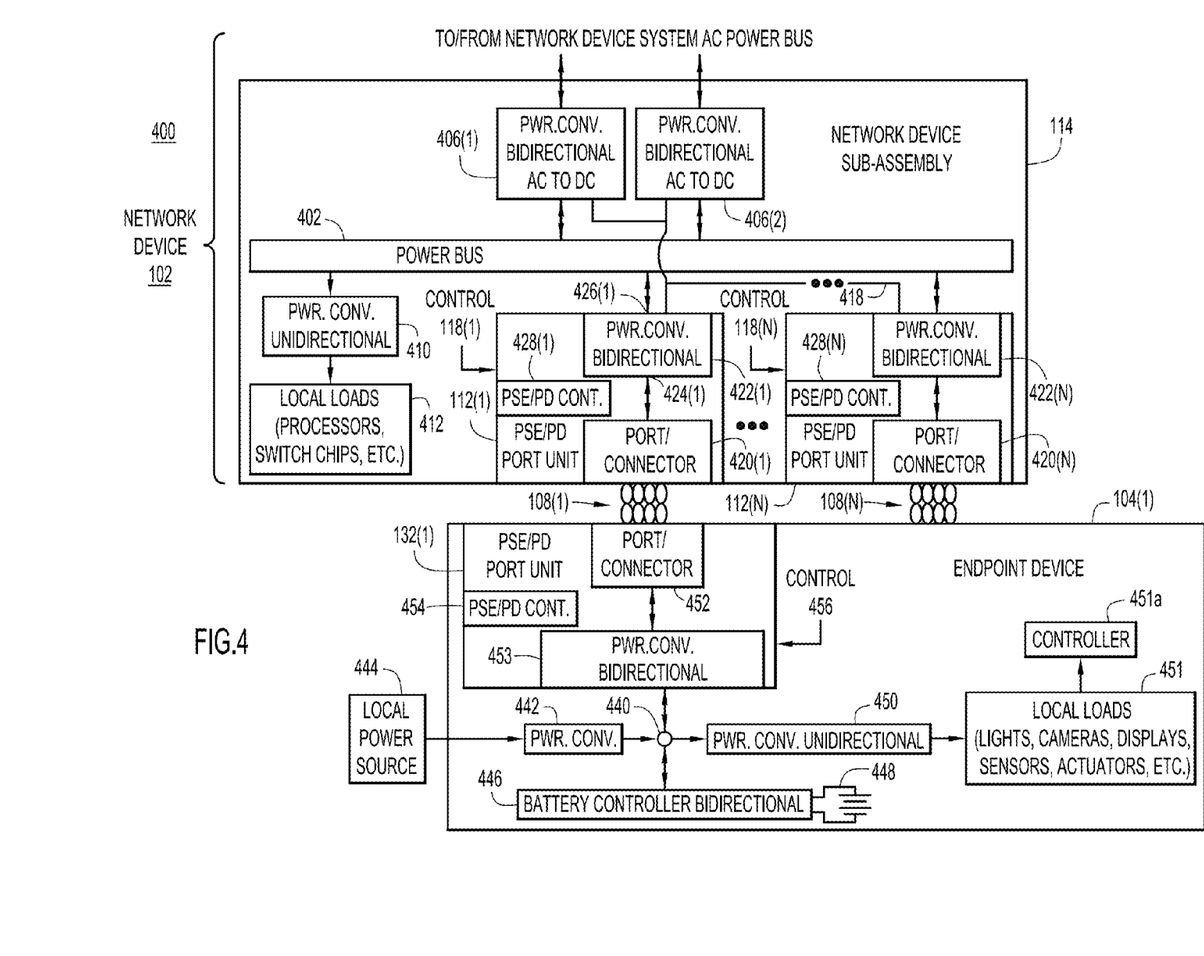
FIG. 4 is a detailed block diagram of a sub-assembly of a network device of FIG. 1, according to an example embodiment.

With reference to FIG. 4, there is depicted a detailed block diagram of sub-assembly 114 of network device 102 (at the top of FIG. 4) and ED 104(1) (at the bottom of FIG. 4). The ensuing description refers to bi-directional "power converters" configured to convert power bi-directionally and provide converted power to associated circuits. In an embodiment, each bi-directional power converter includes a respective bi-directional "voltage converter" that converts voltage bi-directionally and provides converted voltage to the associated circuits.)

In addition to port units 112, sub-assembly 114 includes a local power summing bus 402, such as multiple electrically conductive traces, that serves as both a DC power sink and a DC power source relative to various other electrical components of the sub-assembly. In addition, sub-assembly 114 includes bi-directional power converters, such as, but not limited to, alternating current (AC)-to-DC converters 406(1) and 406(2) to (i) convert AC power received from a system AC power bus of network device 102 (not shown) to DC power (e.g., 48 Volts (V)) and provide the converted DC power to the power summing bus, and (ii) convert DC power received from the power summing bus to AC power and provide that AC power to the system AC power bus. In other embodiments, in which the system AC power bus is replaced or augmented with a system DC bus, AC-to-DC converters 406 are replaced or augmented with DC-to-DC converters. A DC-to-DC power converter 410 is provided to receive DC power (e.g., 48V) from the power summing bus, convert the DC power, and provide the converted DC power (e.g., 5V) to network device circuitry or local loads 412, such as processors, NPUs, and other network device integrated circuits (ICs). A load sharing bus that carries a load sharing signal 418 to the DC-DC power converters in the sub-assembly to balance power across the DC-DC converters.

With reference to port units 112, each port unit 112(i) includes a port/connector 420(i) (e.g., an RJ45 port/connector) to mate with a cable connector on one end of Ethernet cable 108(i). Port 420(i) includes a power injector (descried below in connection with FIG. 5) that, when port unit 112(i) is selectively configured as a PSE port unit, combines DC power with Ethernet data and sends the resulting combined power and data to connector pins of the port that mate with a twisted pair of conductors in cable 108(i). When port unit 112(i) is selectively configured as a PD port unit, the power injector receives combined power and data at the connector pins and separates the power from the data.

Port unit 112(i) also includes a bi-directional DC-to-DC power converter 422(i) and a dual-role PSE/PD controller 428(i) that each receive respective selection signal 118(i). Power converter 422(i) includes a first bi-directional power interface 424(i) connected to network port 420(i) and a second bi-directional power interface 426(i) connected to power summing bus 402. Power converter 422(i) may be, e.g., a 2-quadrant switching power supply/converter, although other configurations are possible. Such a power supply typically includes switching regulator transistors, transformers, voltage and current monitors, and a controller that may be commanded (e.g., by selection signal 118(i)) to supply duty cycle and phase signals to the switching transistors such that power flows in a desired direction (e.g., either upstream or downstream). PSE/PD controller 428 may include analog and/or digital logic to selectively perform either PSE operations or PD operations. Responsive to selection signal 118(1), power converter 422(i) selectively converts power in either the downstream direction to convert DC power (e.g., 48V) from power summing bus 402 and provide the converted power (e.g., 48V) to network port 420(i) when port unit 112(1) is configured to operate as the PSE port unit, or the upstream direction to convert power (e.g., 48V) received from the network port and provided the converted power (e.g., 48V) to the power summing bus when the port unit is configured to operate as the PD port unit. In addition, in response to selection signal 118(1), PSE/PD controller 428(i) selectively operates to perform either PSE operations including PD detection, optional classification, start-up, operation, and disconnect when port unit 112(1) is configured to operate as the PSE port unit, or perform PD operations when the port unit is configured to operate as the PD port unit. PD operations include, for example, presenting to the PSE valid detection and classification signatures responsive to the PSE operations (e.g., detection, classification, and so on).

At any give time, one or more of port units 112 may be selectively configured responsive to corresponding selection signals 118 as PSE port units to draw power from power summing bus 402 and source power to corresponding EDs 104 (i.e., the direction of power flow is in the downstream direction), while one or more other ones of port units 112 may be selectively configured responsive to corresponding selection signals 118 as PD port units to sink power from corresponding EDs 104 and source power to the power summing bus (i.e., the direction of power flow is in the upstream direction). The net energy in and out of summing bus 402 is carefully balanced and instantaneously adjusted via a control system described in connection with FIG. 6.

Turning to ED 104(1), the ED includes a local power summing bus or node 440 that is analogous to power summing bus 402 in network device 102 in that the power summing node serves as a DC power sink and/or a DC power source relative to various other electrical components of the ED, now described. ED 104(1) also includes: a DC-to-DC power converter 442 to receive DC power from an external local power source 444 (e.g., a solar panel), convert the received DC power, and provided the converted DC power (e.g., 48V) to power summing node 440; a bi-directional battery controller 446 to selectively route DC power (e.g., 48V) from a local battery 448 to the power summing node, or from the summing node to the battery to charge the battery; a DC-to-DC power converter 450 to convert DC power (e.g., 48V) from the power summing node and provide the converted power to local circuit loads 451 of ED 104(1), such as lights, cameras, displays, sensors, actuators, or the like, connected to the ED, and a local controller/processor 451*a* of the ED. Battery 448 and power source 444 together correspond to local power source 130(1) in FIG. 1.

As mentioned above, ED 104(1) also includes port unit 132(1). Port unit 132(1) is configured to operate similarly to corresponding dual-role PoE port unit 112(1) of network device 102, and thus includes: a port 452 to mate with a cable connector on an end of cable 108(1) opposite to the end that mates with port 420(1) of network device 102; a bi-directional DC-to-DC power converter 453 connected between the ED port and power summing node 440; and a dual-role PSE/PD controller 454. Power converter 453 and PSE/PD controller 454 are selectively configurable responsive to a selection signal 456 from, e.g., controller 451*a*, to operate in a similar manner as corresponding power converter 422(1) and PSE/PD controller 428(1) of network device port unit 112(1).

Thus, bi-directional DC-to-DC power converter 453 selectively converts power in either the upstream direction from power summing node 440 to ED port 452 when PoE port unit 132(1) is configured to operate as the PSE port unit, or the downstream direction to convert power from the ED port and provided the converted power to the power summing node when the PoE port unit is configured to operate as the PD port unit. Similarly, PSE/PD controller 454 selectively operates to either perform PSE operations including PD detection, optional classification, start-up, operation, and disconnect when port unit 132(1) is configured to operate as the PSE port unit, or perform PD operations, such as presenting a valid detection signature, a valid classification signature, and so on, when the PoE port unit is configured to operate as the PD port unit.

In a situation in which local power sources 444 and 448 of ED 104(1) are not generating power in excess of what the ED needs locally, port units 112(1) and 132(1) are controlled to establish a downstream power flow direction from network device 102 to ED 104(1) over PoE link 106(1) (see FIG. 1). That is, network device 102 and ED 104(1) are configured to perform PSE and PD roles, respectively. In this case, power flows from the system AC power bus of network device 102 through power converters 406 to power summing bus 402. Power flows from power summing bus 402 to power converter 410 so as power loads 412, and to port unit 112(1). Port unit 112(1), configured to operate in the PSE role, combines power with Ethernet data signals and sends the combined power and data to ED port unit 132(1). Port 132(1) receives the combined power and data, separates one from the other, DC converts the separated power, and provides the converter power to power summing node 440. Summing node 440 provides power to battery controller 446 to charge battery 448 (if necessary) and power converter 450 (to power loads 451/451*a*).

An alternative situation may occur in which one or more of local power sources 444 and 448 are generating an excess of power in ED 104(1), or if network device 102 needs to use a portion of the energy stored in battery 448 (for example, during an AC power failure). In this situation, port units 112(1) and 132(1) are controlled to establish an upstream direction of power flow from ED 104(1) to network device 102 over PoE link 106(1). That is, network device 102 and ED 104(1) are configured to perform PD and PSE roles, respectively. Combined power and data flows from ED 104(1) to port unit 112(1). Port unit 112(1) separates the power from the data and provides the power (after conversion thereof) to power summing bus 402. From power summing bus 402, the excess power may be directed in several directions. The excess power may be provided to: other ones of port units 112 so as to provide the excess power to other EDs connected to those port units; loads 412 in network device 102; other sub-assemblies in the same network device 102; power converters 406 to back-drive those power converters so as to dump power into the network device system AC power bus (power converters 406 may also be two quadrant power supplies); other network devices connected in cascade; and a battery feed or AC power grid connection of network device 102.

Figure 5:
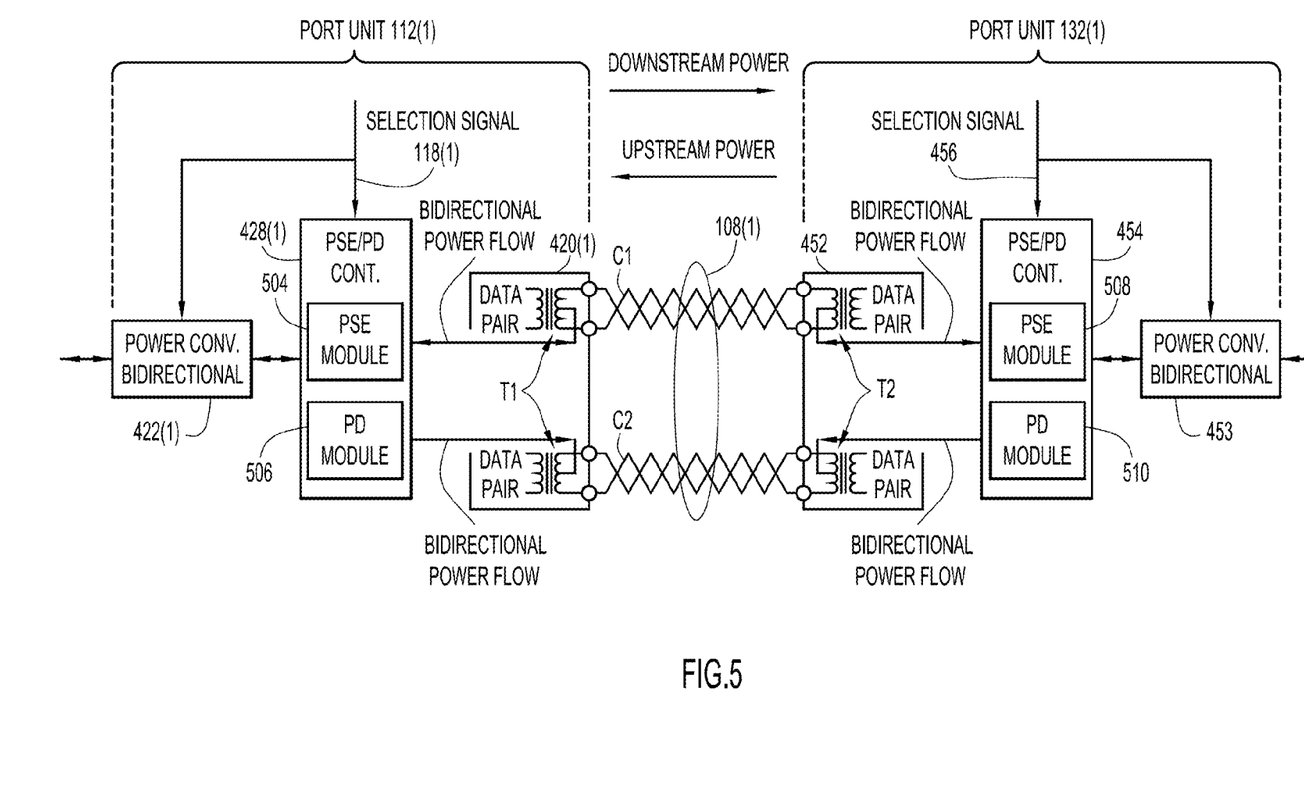
FIG. 5 is a detailed block diagram of a dynamically configurable network port unit and a dynamically configurable endpoint device port unit used to implement a dynamically configurable PoE link, according to an example embodiment.

With reference to FIG. 5, there is depicted a detailed block diagram of network port unit 112(1) and ED port unit 132(1), according to an embodiment. Port 420(1) of network port unit 112(1) includes center-tap transformers T1 that operate as port injectors to either (i) combine data with power and then transmit the combined data and power in the downstream direction, or (ii) separate data from power when combined data and power are received in the upstream direction. Port 452 of ED port unit 132(1) includes similar transformers T2 to either (i) separate combined data and power received in the downstream direction, or (ii) combine data and power in the upstream direction. Combined data and power is carried over twisted pair conductors C1 and C2 in cable 108(1). Thus, PoE power is carried bi-directionally on the same pairs of pins/jacks on ports 420(1) (and 452), and along the same pairs of twisted lines in cables C1 and C2.

In port unit 112(1), power from/to power converter 422(1) to/from port 420(1) is routed through/by way of PSE/PD controller 428(1). PSE/PD controller 428(1) includes a PSE module 504 (e.g., a PSE state machine) to perform the PSE operations described above, and a PD module 506 (e.g., a PD state machine) to perform the PD operations described above. PSE module 504 and PD module 506 are selectively activated to perform their respective functions responsive to selection signal 118(1) as appropriate, i.e., the PSE module is activated if the selection signal indicates PSE operation, and the PD module is activated if the selection signal indicates PD operation. In port unit 132(1), PSE/PD controller 454 is configured to operate similarly to PSE/PD controller 428(1). Thus, PSE/PD controller 454 includes a PSE module 508 and a PD module 510 selectively activated to perform their respective PSE and PD operations responsive to selection signal 456.

Selection signals 118(1) and 456 are provided to/received by PSE/PD controllers 428(1) and 454 and power converters 422(1) and 453, respectively. Selection signals 118(1) and 456 may be discrete analog or digital signals having an analog voltage level or a logic level to select PSE vs. PD operation, or may be control commands transmitted over a digital control bus (e.g., a Peripheral Component Interconnect (PCI) bus or Inter-Integrated Circuit ($I^2C$) bus) coupled to the PSE/PD controllers and the power converters to select PSE vs. PD operation, for example. PSE/PD controllers 428(1) and 454 dynamically switch between PSE and PD roles relatively instantaneously responsive to role selection changes indicated by selection signals 118(1) and 456.

Figure 6:
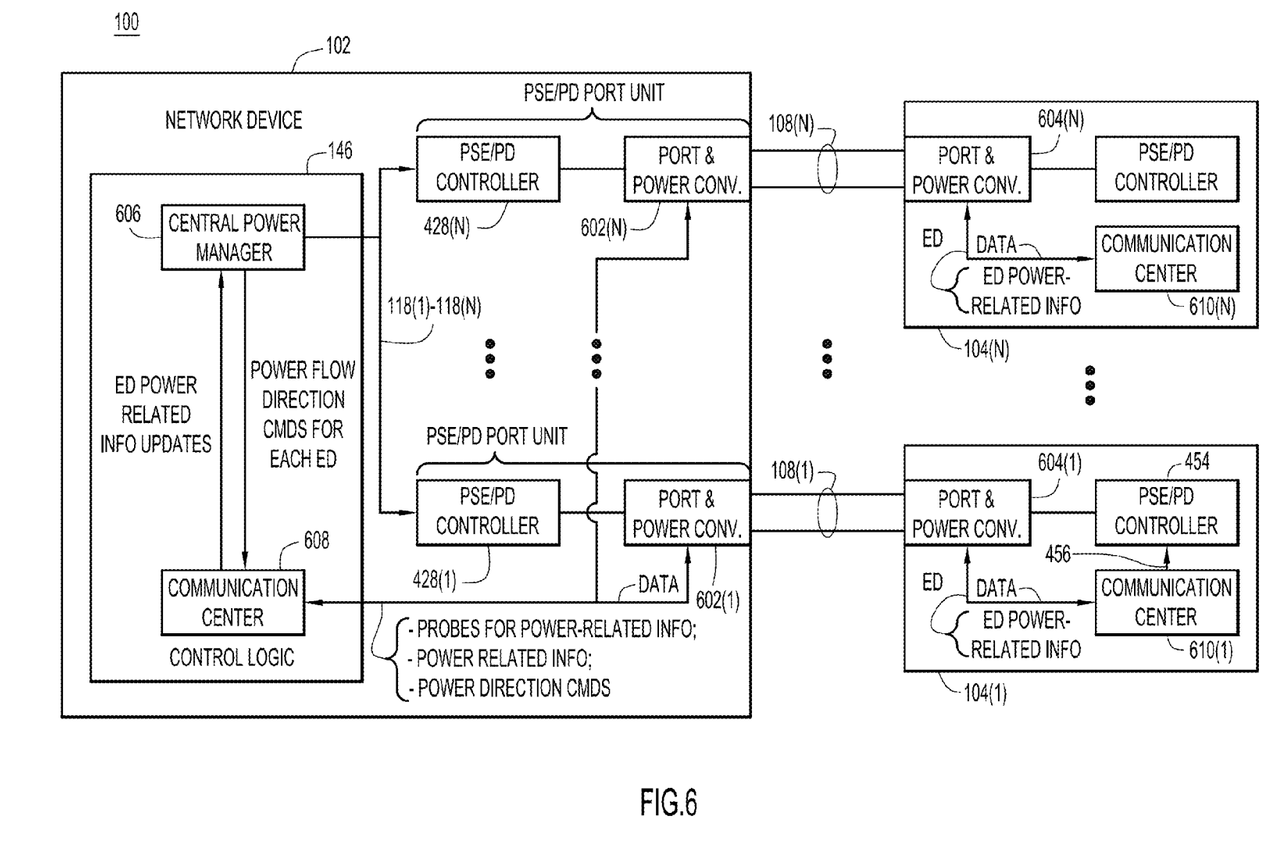
FIG. 6 is a block diagram of an example distribution of control functions/logic and controllers in the system of FIG. 1 used in a power management scheme, according to an example embodiment.

With reference to FIG. 6, there is depicted a block diagram of a distribution of control functions/logic and controllers in system 100, according to an embodiment in which network device 102 operates as a central power manager for the system. In FIG. 6, the port and bi-directional power converter of each PoE port unit are combined into a block referred to as a "Port & Power Converter" represented at 602(i) in network device 102 and 604(i) in each ED 104(i).

Each ED 104(i) includes a local Communication Center 610(i) (i.e., local controller logic) to monitor local power-related parameters (based on monitored currents and voltages), including a power consumption, a power need, battery charge state, current flows into and out of the summing node (e.g., summing node 440), and a measure of any excess power of the ED, and to convey the monitored parameters as power-related information/data to Port & Power Converter 604(i) for transmission to network device 102. Communication center 610(i) also controls the direction of the bidirectional power converters (the ones associated with the battery and PoE interface) on ED 104(i).

In the example of FIG. 6, network device 102 includes Control logic 146 (seen in FIG. 1) configured to include a Central Power Manager 606 to provide overall power management in system 100, and a Communication Center 608 to assist the Central Power Manager. Communication Center 608 collects the local power-related information from EDs 104 over cables 108 of corresponding Ethernet links 106 and reports the collected power-related information to Central Power Manager 606. Central Power Manager 606 issues (i) power flow direction data commands to EDs 104 via Communication Center 608, and (ii) selection signals 118 to PSE/PD controllers 428 in order to control a direction of power flow on each cable 108(i) of the corresponding Ethernet link 106(i).

Figure 7:
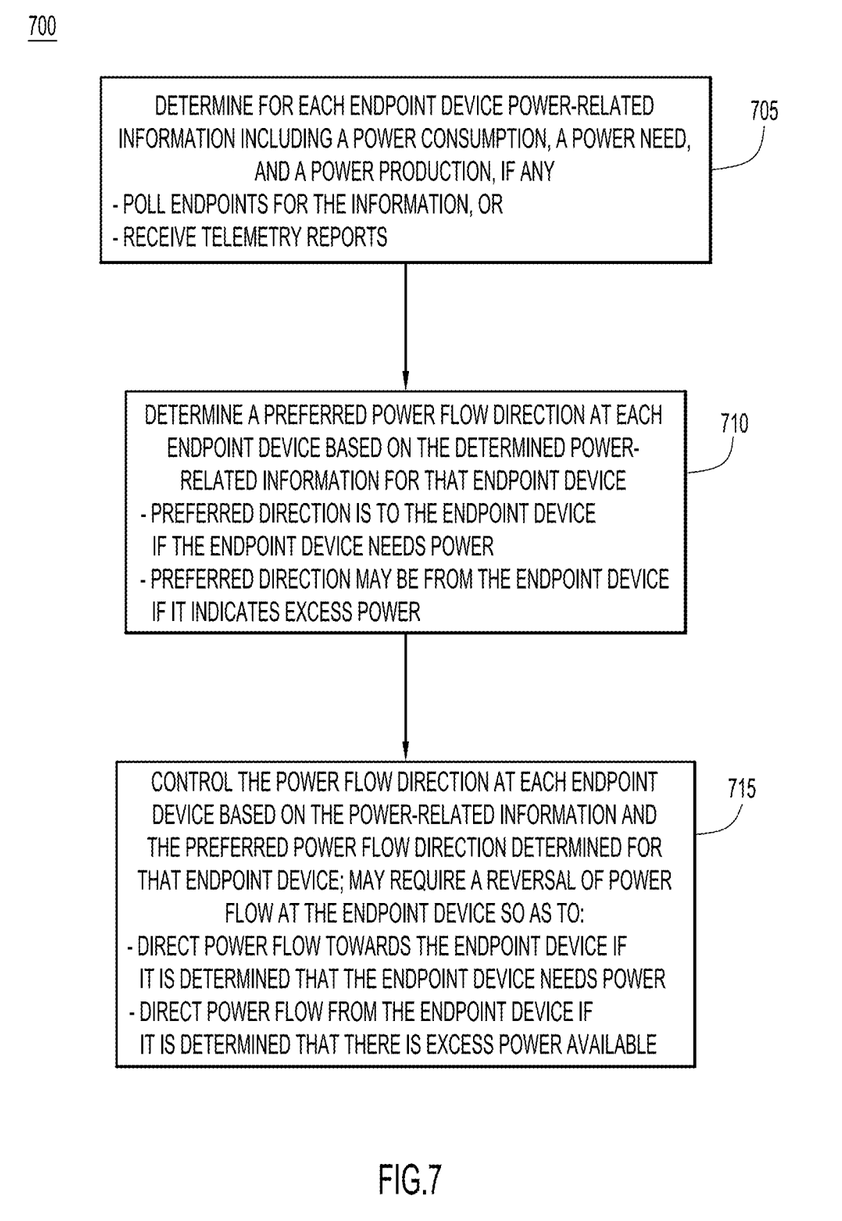
FIG. 7 is a flowchart of an example method of managing power in the system of FIG. 1, according to an example embodiment.

Turning now to FIG. 7, there is shown a flowchart of an example method 700 of managing power in system 100 performed by controller 116, e.g., by executing Control logic 146, including Central Power Manager 606 and Communication Center 608 as appropriate.

At 705, controller 116 determines for each ED 104(i) the power-related information mentioned above. Controller 116 may poll each ED 104(i) for the power related information, and/or receive periodic telemetry reports from each ED. Controller 116 also tracks a power flow direction relative to each ED 104(i), i.e., the present power flow direction on each Ethernet link 106(i).

At 710, controller 116 (e.g., Central Power Manager 606) determines a preferred power flow direction at each ED 104(i) based on the determined power-related information from that ED. The determined preferred direction may be towards ED 104(i) if the ED needs externally provided power from network device 102 because, e.g., local power sources associated with the ED are insufficient. The determined preferred direction may be from ED 104(i) to network device 102 if the ED has indicated an excess of power. Controller 116 may determine preferred power flow directions based on other considerations including maximizing power efficiency, network resiliency, minimizing the cost of power usage across the network of EDs 104 and network device 102, time-of-day, and user configurations.

At 715, controller 116 (e.g., through Central Power Manager 606 and Communication Center 608) controls the power flow direction at each ED 104(i) based on the power-related information and the preferred power flow direction determined for that ED. Controller 116 asserts control signals 118 to set the power flow direction at each port unit 112(i). Depending on the initial power flow direction at each ED 104(i), the power flow direction may need to be reversed at ED 104(i) (and over Ethernet link 106(i)) to comply with the determined preferred direction of power if the initial and preferred power flow directions do not match. Such a reversal may be required so as to direct power flow towards ED 104(i) if is determined that the ED needs externally provided power from network device 102, and direct power flow from ED 104(i) if it is determined that there is excess power is available.

A hand-shake protocol implemented between opposite ends of a given Ethernet link 106(i) (i.e., between PoE port units 112(i) and 132(i)) may be used to achieve a reversal in the power flow direction at operation 715, responsive to an initial command from controller 116 (e.g., request for direction/role-reversal). Such a protocol is described below in connection with FIG. 8.

In another embodiment, one or more of Central Power Manager 606 and Communication Center 608 may be hosted in a cloud based service that communicates with EDs 104 through one or more network devices connected with the EDs. In such an embodiment, the cloud based service communicates with and controls multiple instances of system 100 in a large network.

As mentioned above, method 700 may require a reversal in the power flow direction at any given ED 104(i). Such a reversal may include a hand-shake protocol between opposite ends of the given Ethernet link 106(i).

Figure 8:
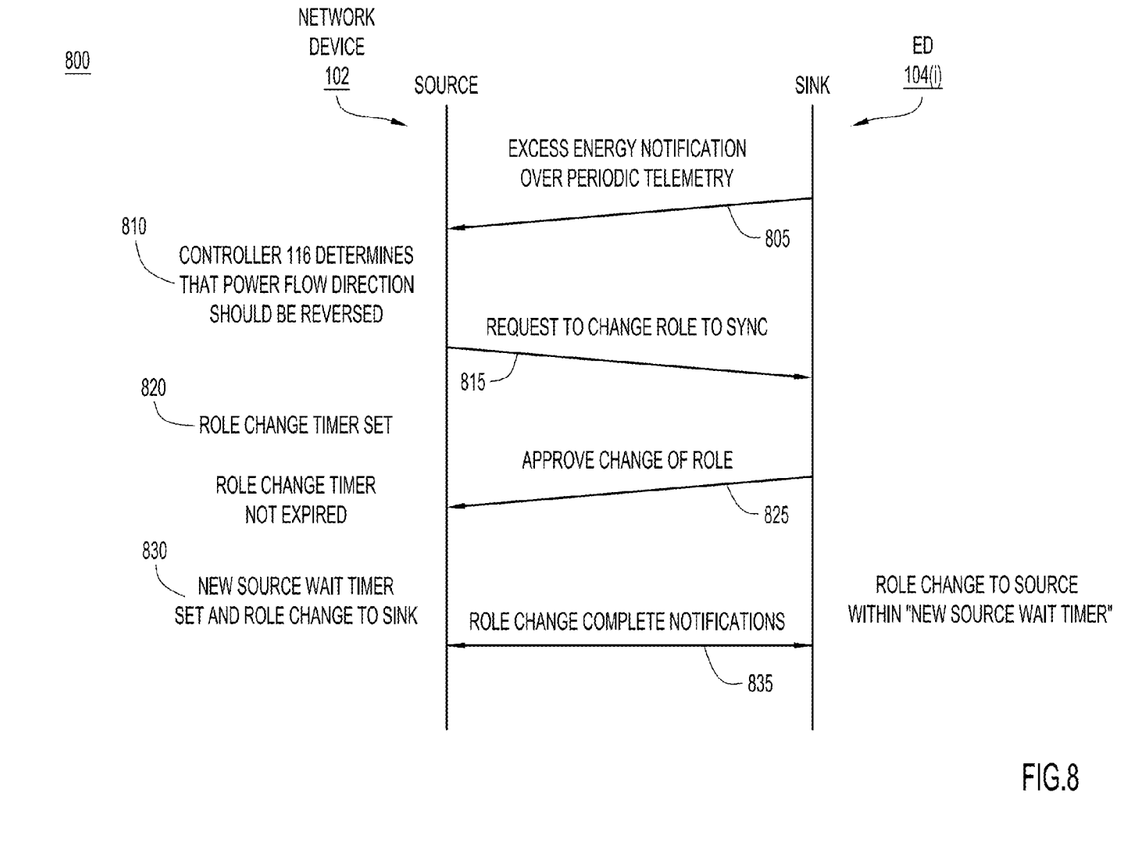
FIG. 8 is an illustration of an example hand-shake protocol implemented between opposite ends of an Ethernet link to reverse a power flow direction on the link, according to an example embodiment.

With reference to FIG. 8, there is an illustration of an example hand-shake protocol 800 implemented between opposite ends of a given Ethernet link 106(i) to reverse a power flow direction on the link. Protocol 800 may be initiated at operation 715 of method 700. Protocol 800 may be implemented in accordance with a Link Layer Data Protocol (LLDP), Cisco Discovery Protocol (CDP), or any other suitable link/data protocol. Alternatively, protocol 800 may be implemented as a physical layer protocol, i.e., at the physical layer.

In the example of FIG. 8, initially, port unit 132(i) of ED 104(i) operates as a power sink and port unit 112(i) of network device 102 operates as a power source, i.e., the power flow direction is downstream to the ED; the roles of power source (PSE) and power sink (PD) may be reversed in other examples.

At 805, ED 104(i) indicates an excess of local power to controller 116.

At 810, controller 116 determines that a reversal in the initial power flow direction over Ethernet link 106(i) is appropriate based on the indication at 805.

At 815, controller 116 causes a message to be sent from source port unit 112(i) to sink port unit 132(i). The message requests approval (from the sink port) of a role change of the source port from PSE to PD.

At 820, a "Role Change Timer" is started. This timer is set such that if no response is received from sink port unit 132(i) before the timer expires, then a retry or abort can be issued.

At 825, sink port unit 132(i) approves the role change before the "Role Change Timer" expires.

At 830, in response to the approval, port unit 112(i) (originally the source) abandons source behavior and switches to sink behavior, i.e., starts operating as a sink port unit. Also, port unit 112(i) starts a "New Source Wait Timer" and waits to receive an appropriate source voltage from port unit 132(i) (which needs to change from sink to source) indicating that port unit 132(i) has switched from sink to source before the time expires. If the timer expires before the appropriate source voltage is received, a retry can be asserted or a message may be sent to port unit 132(i) to solicit status.

At 835, if the appropriate source voltage is received before the timer expires, then new telemetry messages can be sent over Ethernet link 106(i) to signal a successful completion of role reversal. An analogous procedure is used to perform an opposite role reversal if port unit 132(i) of ED 104(i) initially operates as a power source and port unit 112(i) of network device 102 operates as a power sink, i.e., the power flow direction is upstream from the ED.

Techniques are also provided to prevent circuit damage in scenarios in which both ends of an Ethernet link are source at the same time or sink at the same time. During certain error conditions, race conditions, or in case certain control messages are lost in an Ethernet network, there is a slight chance that port units at both ends of an Ethernet link may be configured to drive power towards each other. In one case, both port units may operate as sources. In this case, if one port unit operates as a source, that port unit will fail PoE detection with respect to the opposite source and, therefore, will not draw current. The one port will receive the detection voltage (<10V), which is below a damage threshold. In another case, both port units may operate as sinks. In this case, both port units will not receive a source voltage and hence will not be able to draw power. Also, in most role reversal cases (i.e., power flow direction reversals), both port units will have backup power to sustain their respective operations for a time during which they can send failure recovery message to each other to recover from the error state (since the data channels on the PoE ports are not affected by these direction reversal activities).

Additional protection may be applied to prevent the above error cases from occurring. For example, all messages from controller 106 would have to be acknowledged via the Ethernet network (links) from both the endpoint device controllers and the network device controller. If the correct acknowledgements are not received, the next step of a reversal process that would have otherwise enabled the port unit to switch to the opposite PSE/PD state would be prevented.

As part of periodic telemetry, periodic messages (e.g., once per second) are transmitted from each PoE port unit to the network device or other host of central control. If the current sourced from the PSE end of a link does not closely match the current entering the PD end of the link, this mismatch could indicate a cable fault or other abnormal condition, and an alarm could be raised. Alarms could also be reported in cases where both end port units have the error case of assuming the same role (e.g., both PSE or both PD).

In summary, the foregoing presents techniques to implement a dual-role PoE port unit that is selectively configurable as (i) a PSE port unit to source power through an RJ45 connector/port and that operates in accordance with IEEE 802.3, or (ii) a PD port unit that sinks power from the RJ45 connector/port and also operates in accordance IEEE 802.3. The power flow direction may be controlled dynamically and selectively depending upon instantaneous power needs of equipment connected to the dual-role PoE port unit. Highly dynamic modes of PoE power flow direction switching is supported (for example, when a street light fixture with a solar panel associated with an endpoint device supplies energy to a network during the day, but then extracts energy from the network at night). The ability to dynamically and selectively switch power flow direction to and from endpoint and network devices may also be used in highly distributed energy systems.

In summary, in one form, an apparatus is provided comprising: one or more dual-role PoE port units, each PoE port unit being selectively configurable to operate as either (i) a PSE port unit to provide power to a device connected to the PoE port unit, or (ii) a PoE PD port unit to sink power from the connected device, wherein each PoE port unit includes: a port to mate with a network cable; and a bi-directional power converter (e.g., a DC-to-DC voltage converter) to selectively convert power (e.g., DC voltage) in either a first direction and to provide converted power (e.g., converter DC voltage) to the port when the PoE port unit is configured to operate as the PSE port unit, or in a second direction to convert power (e.g., DC voltage) received from the port and provide converted power (e.g., converted DC voltage) to associated circuits when the PoE port unit is configured to operate as the PD port unit.

In summary, in another form, a method is provided comprising: at a power management controller that controls power flow to or from endpoint devices in a network thereof that are selectively configurable to either sink or source power through respective PoE links that connect the endpoints to one or more respective network devices configured to communicate with the power management controller, each PoE link terminating at opposite ends thereof in a PoE network port unit of a corresponding network device and a PoE endpoint port unit of a corresponding endpoint device, each of the PoE network port units and endpoint port units being selectively configurable to support bi-directional power flow over the PoE link to or from the endpoint device, respectively: determining for each endpoint device power-related information, including a power consumption, a power need, and a power production, if any; determining a preferred power flow direction at each endpoint device based on the determined power-related information for that endpoint device; and controlling the power flow direction at each endpoint device based on the power-related information and the preferred power flow direction determined for that endpoint device.

In summary, in yet another form, an apparatus is provided comprising: multiple dual-role PoE network port units, each PoE port unit being selectively configurable to operate as either (i) a PoE PSE port unit to provide power to a device connected to the PoE port unit, or (ii) a PoE PD port unit to sink power from the connected device; a network processor unit to switch packets between the multiple PoE network port units; and a controller to selectively configure each PoE port unit to operate as either the PoE PSE port unit or the PoE PD port unit independently of other ones of the multiple PoE network ports.

In summary, in still another form, a non-transitory computer readable storage media is provided. The storage media is encoded with instructions that, when executed by a processor that controls power flow to or from endpoint devices in a network thereof that are selectively configurable to either sink or source power through respective Power-over-Ethernet (PoE) links that connect the endpoints to one or more respective network devices configured to communicate with the power management controller, each PoE link terminating at opposite ends thereof in a PoE network port unit of a corresponding network device and a PoE endpoint port unit of a corresponding endpoint device, each of the PoE network port units and endpoint port units being selectively configurable to support bi-directional power flow over the PoE link to or from the endpoint device, respectively, cause the processor to: determine for each endpoint device power-related information, including a power consumption, a power need, and a power production, if any; determine a preferred power flow direction at each endpoint device based on the determined power-related information for that endpoint device; and control the power flow direction at each endpoint device based on the power-related information and the preferred power flow direction determined for that endpoint device.

The above description is intended by way of example only.

What is claimed is:

1. An apparatus comprising:
one or more dual-role Power-over-Ethernet (PoE) port units, each PoE port unit being selectively configurable to switch between (i) a PoE Power Source Equipment (PSE) port unit to provide power to a device connected to the PoE port unit, and (ii) a PoE Powered Device (PD) port unit to sink power from the connected device, wherein each PoE port unit includes:
a port to mate with a network cable;
a bi-directional power converter to selectively convert power in either a first direction to provide converted power to the port when the PoE port unit is configured to operate as the PSE port unit, or in a second direction to convert power received from the port when the PoE port unit is configured to operate as the PD port unit; and
a dual-role PoE controller to selectively perform either PSE operations or PD operations, and, if the controller is required to reverse roles thereof, execute, in accordance with a Link Layer Data Protocol (LLDP), a PoE role-reversal protocol with a connected device in which the controller is configured to:
send a role-reversal approval request to the connected device;
responsive to sending the role-reversal approval request, start a role-change timer;
if a role-reversal approval is received from the connected device before the role-change timer expires, reverse the role of the dual-role PoE controller; and
if an indication of a role-reversal of the connected device is received from the connected device, send a role reversal complete notification to the connected device.

2. The apparatus of claim 1, wherein:
the PSE operations include PoE PD detection, optional classification, and start-up when the PoE port unit is configured to operate as the PSE port unit; and
the PD operations present a detection signature and an optional classification signature responsive to PSE operations when the PoE port unit is configured to operate as the PD port unit.

3. The apparatus of claim 2, wherein each dual-role PoE port unit is selectively configurable responsive to a respective selection signal to switch between the PSE port unit or the PD port unit.

4. The apparatus of claim 3, wherein the dual-role PoE controller is configured to execute the PoE role-reversal protocol with the connected device if the selection signal requires the dual-role PoE controller to reverse the role thereof.

5. The apparatus of claim 1, wherein
to execute the PoE role-reversal protocol, the dual-role PoE controller is further configured to:
if the role-reversal approval is received from the connected device before the role-change-timer expires, start a source wait timer for the connected device; and
if the indication of the role-reversal of the connected device is received from the connected device before the source wait timer for the connected device expires, perform the send the role reversal complete notification to the connected device.

6. The apparatus of claim 1, further comprising:
an electrically conductive power summing bus; and
at least one of:
a local power source to provide power to the power bus; and
a local battery and a battery controller to selectively provide power from and to the battery to and from the summing bus, respectively;
wherein each bi-directional power converter is connected between the summing bus and a respective port so as to receive power from the power summing bus and provide converted power to the respective port when the bi-directional power converter is selectively configured to convert power in the first direction, or receive power from the respective port and provide converted power to the power summing bus when the power converter is selectively configured to convert power in the second direction.

7. The apparatus of claim 1, wherein the one or more dual-role PoE port units includes multiple dual-role PoE port units, each of the multiple dual-role PoE port units including a respective port and a respective bi-directional power converter and being selectively configurable as either a PoE PSE port unit or a PoE PD port unit independently of a configuration state of other ones of the multiple PoE port units.

8. The apparatus of claim 7, further comprising an electrically conductive power summing bus, wherein each of the bi-directional power converters is connected to the summing bus and a respective port so as to receive power from the power summing bus and provide converted power to the respective port when the bi-directional power converter is selectively configured to convert power in the first direction, or receive power from the respective port and provide converted power to the power summing bus when the power converter is selectively configured to convert power in the second direction.

9. The apparatus of claim 8, further comprising one or more further bi-directional power converters connected between the summing bus and a system power bus and configured to selectively convert power from the system power bus to provide converted power to the summing bus or convert power from the summing bus to provide converted power to the system power bus.

10. The apparatus of claim 8, wherein each of the bi-directional power converters is a two-quadrant direct current (DC)-to-DC power converter having first and second bi-directional power interfaces connected respectively to the power summing bus and the respective port.

11. The apparatus of claim 7, further comprising: a network interface unit to switch network packets between the multiple dual-role PoE port units, wherein one or more of the multiple dual-role PoE port units are configured as PoE PSE port units and one or more of the multiple dual-role PoE port units are configured as PoE PD port units.

12. A method comprising:
at a power management controller that controls power flow to or from endpoint devices in a network thereof that are selectively configurable to either sink or source power through respective Power-over-Ethernet (PoE) links that connect the endpoint devices to one or more respective network devices configured to communicate with the power management controller, each PoE link terminating at opposite ends thereof in a PoE network port unit of a corresponding network device and a PoE endpoint port unit of a corresponding endpoint device, each of the PoE network port units and endpoint port units being selectively configurable to support bi-directional power flow over the PoE link to or from the corresponding endpoint device, respectively:
determining for each of the endpoint devices power-related information, including a power consumption, an energy reserve, a power need, and a power production, if any;
determining a preferred power flow direction at each of the endpoint devices based on the determined power-related information for that endpoint device;
controlling the power flow direction at each of the endpoint devices based on the power-related information and the preferred power flow direction determined for that endpoint device; and
execute, in accordance with a Link Layer Data Protocol (LLDP), a PoE role-reversal protocol with at least one endpoint device among the endpoint devices, over the PoE link that connects the at least one endpoint device to a respective network device, to selectively configure the PoE endpoint port unit of the at least one endpoint device to reverse the power flow over the PoE link, the PoE role-reversal protocol including:
sending a role-reversal approval request to the at least one endpoint device;
responsive to the sending, starting a role-change timer;
if a role-reversal approval is received from the at least one endpoint device before the role-change timer expires, reversing the role of the PoE endpoint port unit in the at least one endpoint device; and
if an indication of a role-reversal of the at least one endpoint device is received from the at lease one endpoint device, sending a role reversal complete notification to the at least one endpoint device.

13. The method of claim 12, wherein the controlling includes:
directing power towards a given endpoint device if the given endpoint device requires power from the corresponding network device; and
reversing the power flow direction at the given endpoint device if an existing power flow direction is from the given endpoint device.

14. The method of claim 12, wherein:
the determining a preferred power flow direction includes determining that the preferred power flow direction at a given endpoint device is from the given endpoint device if the power-related information for the given endpoint device indicates an excess of power at that device; and
the controlling includes reversing the power flow direction at the given endpoint device to match the determined preferred power flow direction from the endpoint device if the power flow direction is towards the endpoint device.

15. The method of claim 12, further comprising determining power-related information across the endpoint devices, including:
polling one or more of the endpoint devices for the power-related information; and
receiving unsolicited reports containing the power-related information from one or more of the endpoint devices.

16. An apparatus comprising:
multiple dual-role Power-over-Ethernet (PoE) network port units, each PoE port unit being selectively configurable to switch between (i) a PoE Power Source Equipment (PSE) port unit to provide power to a device connected to the PoE port unit, and (ii) a PoE Powered Device (PD) port unit to sink power from the device connected to the PoE port unit, each PoE port unit including a network port to mate with a network cable, and a bi-directional power converter to selectively convert power in either a first direction to provide converted power to the network port when the PoE port unit is configured to operate as the PSE port unit, or in a second direction to convert power received from the network port when the PoE port unit is configured to operate as the PoE PD port unit; and
an electrically conductive power summing bus;
wherein each of the bi-directional power converters is connected between the electrically conductive summing bus and the respective network port so as to receive power from the power summing bus and provide power to the respective network port when the bi-directional power converter is selectively configured to convert power in the first direction, and receive power from the respective network port and provide converted power to the electrically conductive power summing bus when the power converter is selectively configured to convert power in the second direction; and
a controller to selectively configure each PoE port unit to operate as either the PoE PSE port unit or the PoE PD port unit independently of other ones of the multiple PoE network ports, wherein the controller is further configured to configure first and second ones of the PoE port units to operate, respectively, to receive power from and to provide power to the electrically conductive summing bus at the same time.

17. The apparatus of claim 16, wherein each PoE port unit further includes a dual-role PoE controller to selectively operate to either:

perform PSE operations including PoE PD detection, optional classification, and start-up when the PoE port unit is configured to operate as the PSE port unit; or perform PD operations when the PoE port unit is configured to operate as the PD port unit.

18. The apparatus of claim 16, wherein each of the bi-directional power converters is a two-quadrant direct current (DC)-to-DC power converter having first and second bi-directional power interfaces connected respectively to the power summing bus and the respective network port.

19. The apparatus of claim 16, further comprising a network processor unit to switch packets between the multiple PoE network port units.

20. A non-transitory computer readable storage media encoded with instructions that, when executed by a processor that controls power flow to or from endpoint devices in a network thereof that are selectively configurable to either sink or source power through respective Power-over-Ethernet (PoE) links that connect the endpoint devices to one or more respective network devices configured to communicate with the power management controller, each PoE link terminating at opposite ends thereof in a PoE network port unit of a corresponding network device and a PoE endpoint port unit of a corresponding endpoint device, each of the PoE network port units and endpoint port units being selectively configurable to support bi-directional power flow over the corresponding PoE link to or from the endpoint device, respectively, cause the processor to:

determine for each endpoint device power-related information, including a power consumption, a power need, and a power production, if any;

determine a preferred power flow direction at each endpoint device based on the determined power-related information for that endpoint device;

control the power flow direction at each of the endpoint devices based on the power-related information and the preferred power flow direction determined for that endpoint device; and execute, in accordance with a Link Layer Data Protocol (LLDP), a PoE role-reversal protocol with at least one endpoint device among the endpoint devices, over the PoE link that connects the at least one endpoint device to the respective network device, to selectively configure the PoE endpoint port unit of the at least one endpoint device to reverse the power flow over the PoE link, wherein the instructions to cause the processor to execute include instructions to cause the processor to:

send a role-reversal approval request to the at least one endpoint device;

responsive to the sending of the role-reversal approval request, start a role-change timer;

if a role-reversal approval is received from the at least one endpoint device before the role-change-timer expires, reverse the role of the PoE endpoint port unit in the at least one endpoint device; and if an indication of a role-reversal of the at least one endpoint device is received from the endpoint device, send a role reversal complete notification to the at least one endpoint device.

21. The computer readable storage media of claim 20, wherein the instructions include instructions to cause the processor to:

direct power towards a given endpoint device if the endpoint device requires power from the corresponding network device; and reverse the power flow direction at the given endpoint device if an existing power flow direction is from the given endpoint device.

22. The computer readable storage media of claim 20, wherein the instructions include instructions to cause the processor to:

the determine a preferred power flow direction includes determining that the preferred power flow direction at a given endpoint device is from the given endpoint device if the power-related information for the given endpoint device indicates an excess of power at that device; and the control includes reversing the power flow direction at the given endpoint device to match the determined preferred power flow direction from the endpoint device if the power flow direction is towards the endpoint device.

23. The computer readable storage media of claim 20, wherein the instructions include instructions to cause the processor to:

poll one or more of the endpoint devices for the power-related information; and receive unsolicited reports containing the power-related information from one or more of the endpoint devices.

* * * * *